United States Patent [19]

Iizuka

[11] Patent Number: 5,648,865
[45] Date of Patent: Jul. 15, 1997

[54] SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 362,980

[22] Filed: Dec. 23, 1994

[30] Foreign Application Priority Data

Dec. 27, 1993 [JP] Japan ................................ 5-333189
Aug. 31, 1994 [JP] Japan ................................ 6-207183

[51] Int. Cl.$^6$ ........................................................ G02B 26/08
[52] U.S. Cl. ........................... 359/208; 359/205; 359/207; 359/662; 347/256; 347/259
[58] Field of Search ................................ 359/205–208, 359/216–219, 662; 347/225, 256, 258, 261; 250/227.26, 230

[56] References Cited

U.S. PATENT DOCUMENTS

| | | | |
|---|---|---|---|
| 4,908,708 | 3/1990 | Kuroda ................................ | 348/350 |
| 5,064,260 | 11/1991 | Shiraishi ................................ | 359/205 |
| 5,111,219 | 5/1992 | Makino ................................ | 347/259 |
| 5,168,386 | 12/1992 | Galbraith ................................ | 359/215 |
| 5,233,457 | 8/1993 | Hamada et al. ................................ | 359/216 |
| 5,408,095 | 4/1995 | Atsuumi et al. ................................ | 250/236 |

Primary Examiner—Paul M. Dzierzynski
Assistant Examiner—Darren E. Schuberg
Attorney, Agent, or Firm—Greenblum & Bernstein P.L.C.

[57] ABSTRACT

A scanning optical system including a light deflector rotating about a rotational axis perpendicular to a main scanning direction, a laser beam emitter for emitting a laser beam which scans a scanning surface along the main scanning direction and for making the laser beam incident upon the light deflector with a first angle with respect to a sub-scanning direction perpendicular to the main scanning direction, a curved mirror having a curvature at least along the main scanning direction for reflecting a laser beam deflected by the light deflector with a second angle with respect to an incident laser beam upon the curved mirror, and an anamorphic lens disposed between the curved mirror and the scanning surface. The anamorphic lens has a first surface having a first aspherical surface along the main scanning direction, and a second surface having a second aspherical surface which is not rotationally symmetrical about an optical axis of the anamorphic lens. A radius of curvature of the second aspherical surface along the sub-scanning direction away from the optical axis is independent of the shape of the second aspherical surface along the main scanning direction. The laser beam emitter emits the laser beam towards the rotational axis such that the laser beam emitted from the laser beam emitter incident upon the light deflector is formed on a sub-scanning plane which extends in the sub-scanning direction and includes the optical axis of the anamorphic lens. The first and second angles are measured on the sub-scanning plane.

20 Claims, 16 Drawing Sheets

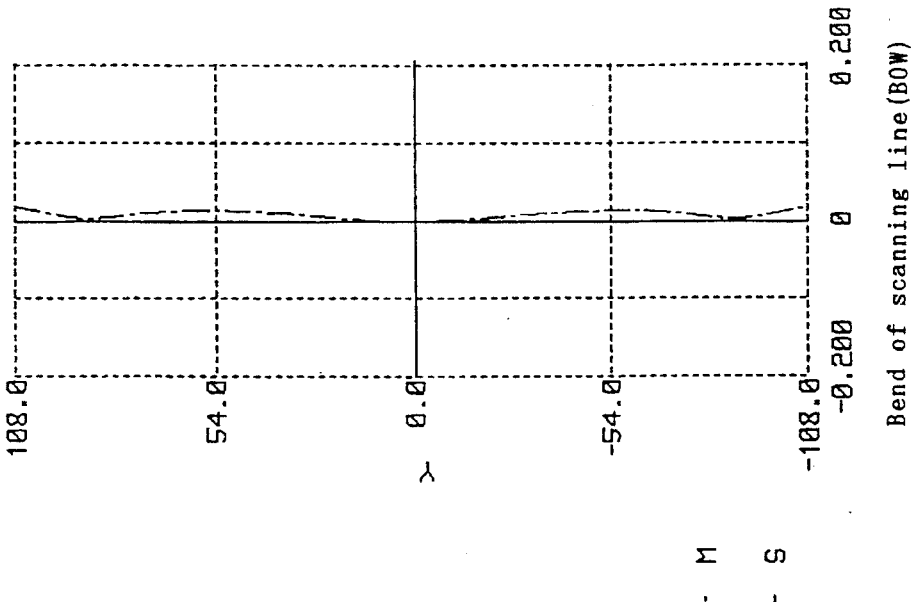
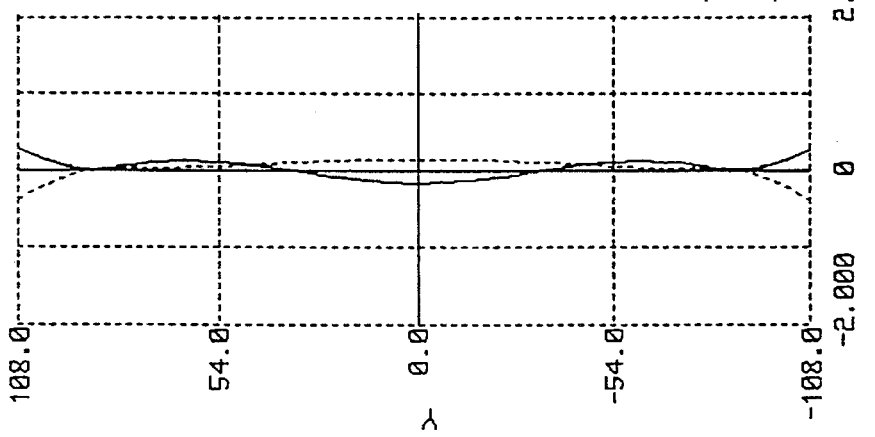
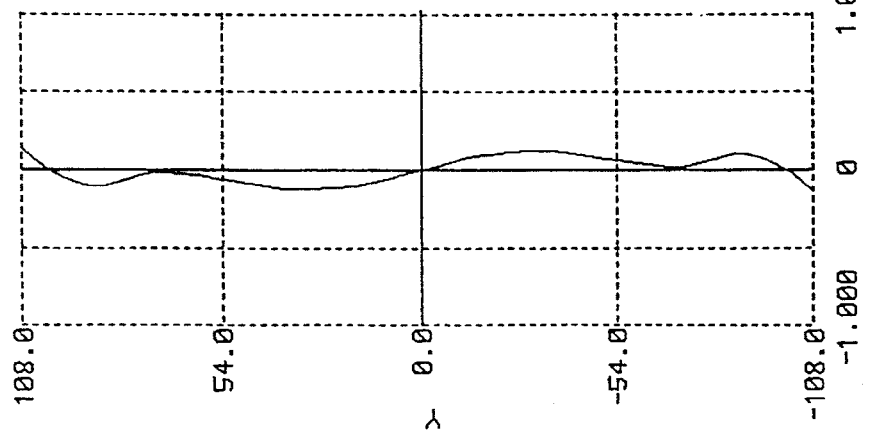

SCANNING OPTICAL SYSTEM

BACKGROUND OF THE INVENTION

1. Field of the Invention

The present invention relates to a scanning optical system, and more particularly, to a scanning optical system utilizing a curved mirror instead of a scanning lens such as an fθ lens.

2. Description of the Related Art

A scanning optical system is essential to a laser printer, a laser scanner, a bar code reader or the like. In a scanning optical system, a polygonal mirror, a hologram disk or the like is used as a light deflector. A laser beam emitted from a semiconductor laser is incident upon and deflected by the light deflector. Then the laser beam passes through such a scanning lens system as an fθ lens system to scan a predetermined area on a scanning surface (i.e., the main scanning is executed). The scanning surface is, e.g., a sensitive paper or plate. While the main scanning is being executed, the scanning surface is moved in the direction perpendicular to the direction of the main scanning (i.e., the sub-scanning is executed). Thus, the scanning surface is two-dimensionally scanned.

In a conventional arrangement, the laser beam deflected by a light deflector passes through such a scanning lens system as an fθ lens system as noted above. However, in the case that a scanning optical system is used as a writing or reading optical system utilizing a multicolor light source, a chromatic aberration occurs. For this reason, in recent years, there has been proposed a scanning optical system utilizing a curved mirror instead of a scanning lens system.

SUMMARY OF THE INVENTION

The primary object of the present invention is to provide a scanning optical system in which a curved mirror can be made small and the distance between the curved mirror and a photosensitive drum (i.e., scanning surface or image plane) can be made long.

Another object of the present invention is to provide a scanning optical system which is easily mass-produced while adopting an aspherical surface which is rotationally symmetrical about the optical axis of an element having the aspherical surface.

According to the first aspect of the present invention, there is provided a scanning optical system which includes a light deflector rotating about a rotational axis perpendicular to a main scanning direction, a laser beam emitter for emitting a laser beam which scans a scanning surface along the main scanning direction and for making the laser beam incident upon the light deflector with a first angle, a curved mirror having a curvature at least along the main scanning direction for reflecting a laser beam deflected by the light deflector with a second angle with respect to an incident laser beam upon the curved mirror, and an anamorphic lens disposed between the curved mirror and the scanning surface. The anamorphic lens has a first surface having a first aspherical surface at least along the main scanning direction, i.e., having an aspherical cross-section at least along the main scanning direction, and a second surface having a second aspherical surface having no rotational axis and which is further not rotationally symmetrical about an optical axis of the anamorphic lens. A radius of curvature of the second aspherical surface along a sub-scanning direction perpendicular to the main scanning direction away from the optical axis is independent of the shape of the second aspherical surface along the main scanning direction. The laser beam emitter emits the laser beam toward the rotational axis. Further, the first and second angles are measured on a sub-scanning plane which extends in the sub-scanning direction and includes the optical axis of the anamorphic lens.

With this arrangement, even if the scanning coefficient is set small, so as to downsize the curved mirror, the curvature of field mainly in the main scanning direction can be corrected by the first aspherical surface of the anamorphic lens, the curvature of field mainly in the sub-scanning direction can be corrected by the second aspherical surface, and the distance between the curved mirror and the scanning surface can be set long.

Preferably, the first surface is rotationally symmetrical about the optical axis of the anamorphic lens.

Preferably, the reflection surface of the curved mirror is rotationally symmetrical about the optical axis of the curved mirror.

Preferably, the curved mirror has an aspherical surface along the main scanning direction. With this structure, the curvature of field in the main scanning direction can be more effectively corrected.

Preferably, the anamorphic lens is disposed in a manner such that the optical axis of the anamorphic lens is shifted away from the optical axis of the scanning optical system in the sub-scanning direction. With this structure, the deviation of a wave surface of light which occurs when the laser beam incident upon the light deflector has an angle with respect to the sub-scanning direction can be corrected.

According to the second aspect of the present invention, there is provided a scanning optical system including a light deflector, a laser beam emitter for emitting a laser beam which scans a scanning surface along a main scanning direction and for making the laser beam incident upon the light deflector with a first angle with respect to a sub-scanning direction perpendicular to the main scanning direction, a curved mirror having a curvature at least along the main scanning direction for reflecting a laser beam deflected by the light deflector with a second angle with respect to an incident laser beam upon the curved mirror, and, an anamorphic lens disposed between the curved mirror and the scanning surface. The anamorphic lens has an aspherical surface having an aspherical cross section along the main scanning direction, the aspherical surface having a rotational axis substantially parallel to the main scanning direction. With this arrangement, even if the scanning coefficient is set small, so as to downsize the curved mirror, the curvature of field mainly in the main scanning direction can be corrected by the above aspherical surface of the anamorphic lens. Furthermore, this aspherical surface can be easily made since the aspherical surface is an aspherical surface having a rotational axis.

Preferably, the reflection surface of the curved mirror is rotationally symmetrical about the optical axis of the curved mirror.

Preferably, the aspherical surface is formed on a first surface of the anamorphic lens, and the anamorphic lens has a second surface which is rotationally symmetrical about the optical axis of the anamorphic lens.

Preferably, the curved mirror has an aspherical surface along the main scanning direction. With this construction, the curvature of field in the main scanning direction can be more effectively corrected.

In other words, in accordance with the second aspect of the present invention, the curved mirror can be made small while the distance between the curved mirror and the scanning surface can be maintained, by means of having the anamorphic lens include an aspherical surface along the main scanning direction. It is more effective for it to make the curved mirror have an aspherical surface.

Preferably, the aspherical surface diverges from the convex side of a spherical reference surface with an increase in distance from the optical axis of the anamorphic lens.

Preferably, the anamorphic lens is disposed in a manner such that the optical axis of the anamorphic lens is shifted away from the optical axis of the scanning optical system in the sub-scanning direction so as to correct the deviation of a wave surface of light which occurs when the laser beam incident upon the light deflector has an angle with respect to the sub-scanning direction.

The present disclosure relates to subject matter contained in Japanese Patent Application No. 5-333189 (filed on Dec. 27, 1993) and Japanese Patent Application No. 6-207183 (filed on Aug. 31, 1994) which are expressly incorporated herein by reference in their entireties.

BRIEF DESCRIPTION OF THE DRAWINGS

The present invention will be more apparent from the ensuing description with reference to the accompanying drawings wherein:

FIG. 8 is a graph showing the fθ characteristic in the scanning optical system according to the second embodiment of the present invention;

FIG. 9 is a graph showing the curvature of field in the scanning optical system according to the second embodiment of the present invention;

FIG. 10 is a graph showing the bow in the scanning optical system according to the second embodiment of the present invention;

DETAILED DESCRIPTION OF THE PREFERRED EMBODIMENTS

Figure 1:
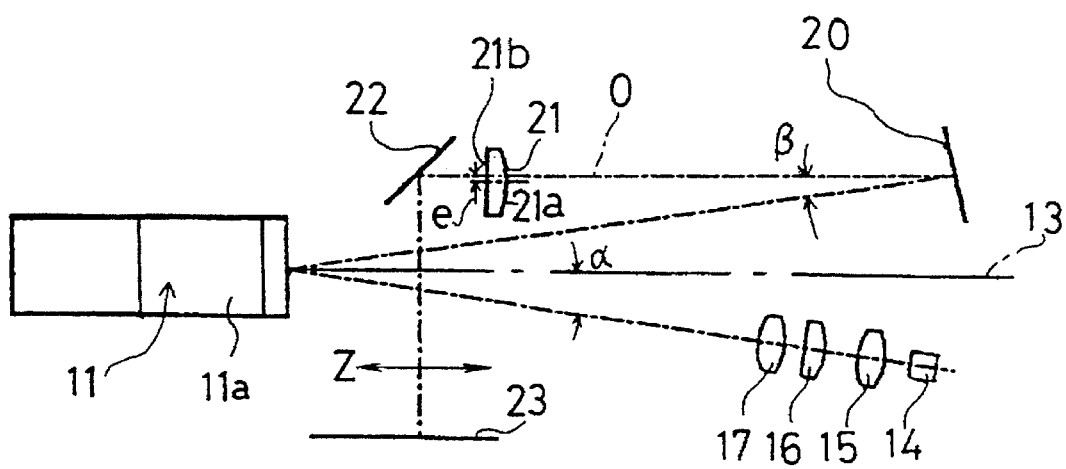
FIG. 1 shows the arrangement of a scanning optical system along a sub-scanning plane, according to the first embodiment of the present invention.

Generally, in a scanning optical system, a semiconductor laser emits a beam of light which scans a scanning surface along a predetermined scanning direction. While scanned along the predetermined scanning direction, the scanning surface is moved, relative to the position where the beam of light scans, in the direction perpendicular to the predetermined scanning direction. Thus, the scanning surface is two-dimensionally scanned. In the following description, the predetermined scanning direction is referred to as a main scanning direction, and the direction of the relative movement of the scanning surface is referred to as a sub-scanning direction.

FIGS. 1–13 relate to a scanning optical system according to a first aspect of the present invention. A polygonal mirror 11, acting as a light deflector, includes a plurality of reflection surfaces 11a and is driven to rotate about a rotation axis 12. As laser beam, emitted from a semiconductor laser 14, is incident upon the plurality of reflection surfaces 11a with a predetermined angle α relative to a plant 13 perpendicular to the plurality of reflection surfaces 11a. The laser beam emitted from the semiconductor laser 14 passes through a collimator lens 15 collimating the laser beam, a cylindrical lens 16 having power only in the sub-scanning direction Z and a condenser lens 17 having power in both main and sub-scanning directions Y and Z, and then is incident upon the polygonal mirror 12.

A curved mirror 20 is disposed so as to reflect the laser beam deflected by the polygonal mirror 11. The curved mirror 20 has a curvature at least in the main scanning direction Y and is disposed in a manner such that the laser beam is reflected on the curved mirror 20 with an angle α with respect to the incident laser beam upon the curved mirror 20.

Figure 2:
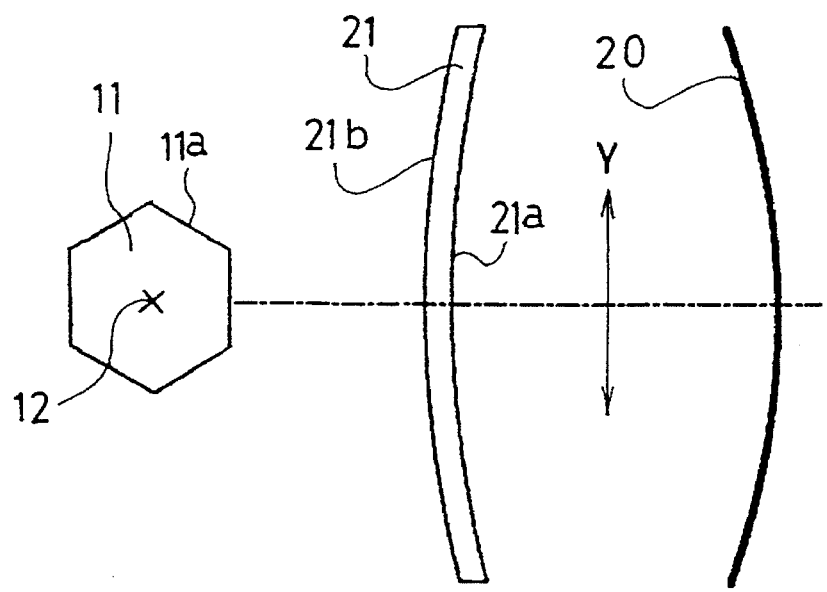
FIG. 2 shows the arrangement of the scanning optical system shown in FIG. 1 along a main scanning plane.

An anamorphic lens peculiar to the present invention is disposed on the path of the laser beam reflected upon the curved mirror 20. The laser beam reflected upon the curved mirror 20 is converged in the sub-scanning direction Z by the anamorphic lens 21 to scan a scanning surface, e.g., a photosensitive drum 23, through a mirror 22. The anamorphic lens 21 has a predetermined shape having a weak power in the main scanning direction Y as shown in FIG. 2 but a positive power in the sub-scanning direction Z as shown in FIG. 1. The anamorphic lens 21 is disposed in a manner such that the optical axis thereof is shifted away from the optical axis 0 of the scanning optical system or from a laser beam scanning plane by a distant "e" as shown in FIG. 1. As noted above, this displacement is effective for correcting the deviation of a wave surface of light which occurs when the laser beam incident upon the light deflector 11 has an angle with respect to the sub-scanning direction Z.

In the scanning optical system to which the first aspect of the present invention is applied, the laser beam emitted from the semiconductor laser 14 is converged both in the main and sub-scanning directions Y and Z through the collimator lens 15, the cylindrical lens 16, and the condenser lens 17 and then incident upon the polygonal mirror 11 towards the rotational center thereof to be reflected on the plurality of reflection surfaces 11a. The laser beam emitted from the semiconductor laser 14 is converged in the sub-scanning direction Z mainly by the cylindrical lens 16 to form a line image extending in the main scanning direction Y in the vicinity of one of the plurality of reflection surfaces 11a which faces the anamorphic lens 21. The laser beam reflected by the plurality of reflection surfaces 11a is reflected on the curved mirror 20, then converged in the sub-scanning direction Z by the anamorphic lens 21, then reflected on the mirror 22, and then incident upon the scanning surface 23 to scan the same. Thus, the laser beam emitted from the semiconductor 14 is converged onto the scanning surface 23 in the main scanning direction Y mainly by the condenser lens 17 and the curved mirror 20 and in the sub-scanning direction Z by the cylindrical lens 16, the condenser lens 17 and the anamorphic lens 21.

According to the above-noted arrangement in which the laser beam is made incident upon the polygonal mirror 11 towards the rotational center thereof, the scanning angle depending upon the size of the polygonal mirror 11 can be set large. Thus, scanning the scanning surface 23 of a wide range can be realized in the case that the size of the polygonal mirror 11 is fixed, and making the diameter of the polygonal mirror 11 small can be realized in the case that the scanning range is fixed.

One feature of the scanning optical system according to the first aspect of the present invention comprises forming the anamorphic lens 21 in a manner such that one side of the anamorphic lens 21 has an aspherical cross section, along the main scanning direction Y, being rotationally symmetrical about the optical axis of the anamorphic lens 21, and that the other side of the anamorphic lens 21 has an aspherical surface, having no rotational axis and which is not rotationally symmetrical about the optical axis of the anamorphic lens 21. Another feature of the scanning optical system according to the first aspect of the present invention comprises forming the curved mirror 20 to have an aspherical surface along the main scanning direction Y.

Figure 3:
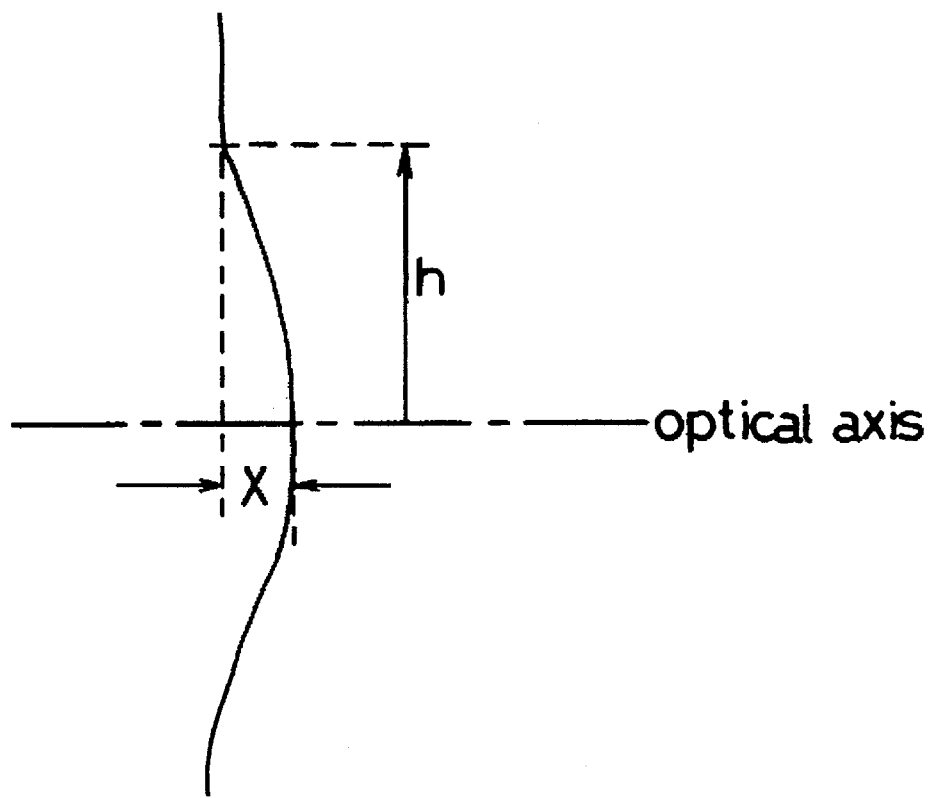
FIG. 3 is a conceptional figure of an aspherical surface which is rotationally symmetrical and used in the scanning optical system to which the present invention is applied.

A rotationally symmetrical aspherical surface is defined by FIG. 3 and the below Equation 1:

$$x = Cy^2/\{1+[1-(1+K)C^2y^2]^{1/2}\} + A4y^4 + A6y^6 + A8y^8 + A10y^{10} + \ldots$$

wherein,

"y" represents a height from the optical axis,

"x" represents a distance from a tangent plane of an aspherical vertex,

"C" represents a curvature of the aspherical vertex (1/r),

"K" represents a conic constant,

"A" represents a fourth-order aspherical factor,

"A6" represents a sixth-order aspherical factor,

"A8" represents an eighth-order aspherical factor,

"A10" represents a tenth-order aspherical factor.

The curvature of field in the main scanning direction Y and the fθ characteristic can be corrected by forming either surface of the anamorphic lens 21, e.g., the first surface 21a, as an aspherical surface, along the main scanning direction Y, rotationally symmetrical about the optical axis of the anamorphic lens 21. The curvature of field in the main scanning direction Y can be better corrected by further forming the aspherical surface of the curved mirror 20 as an aspherical surface which is rotationally symmetrical about the optical axis, i.e., center axis, of the curved mirror 20. The center axis is a perpendicular line to the center of the reflection surface of the curved mirror 20.

Figure 4:
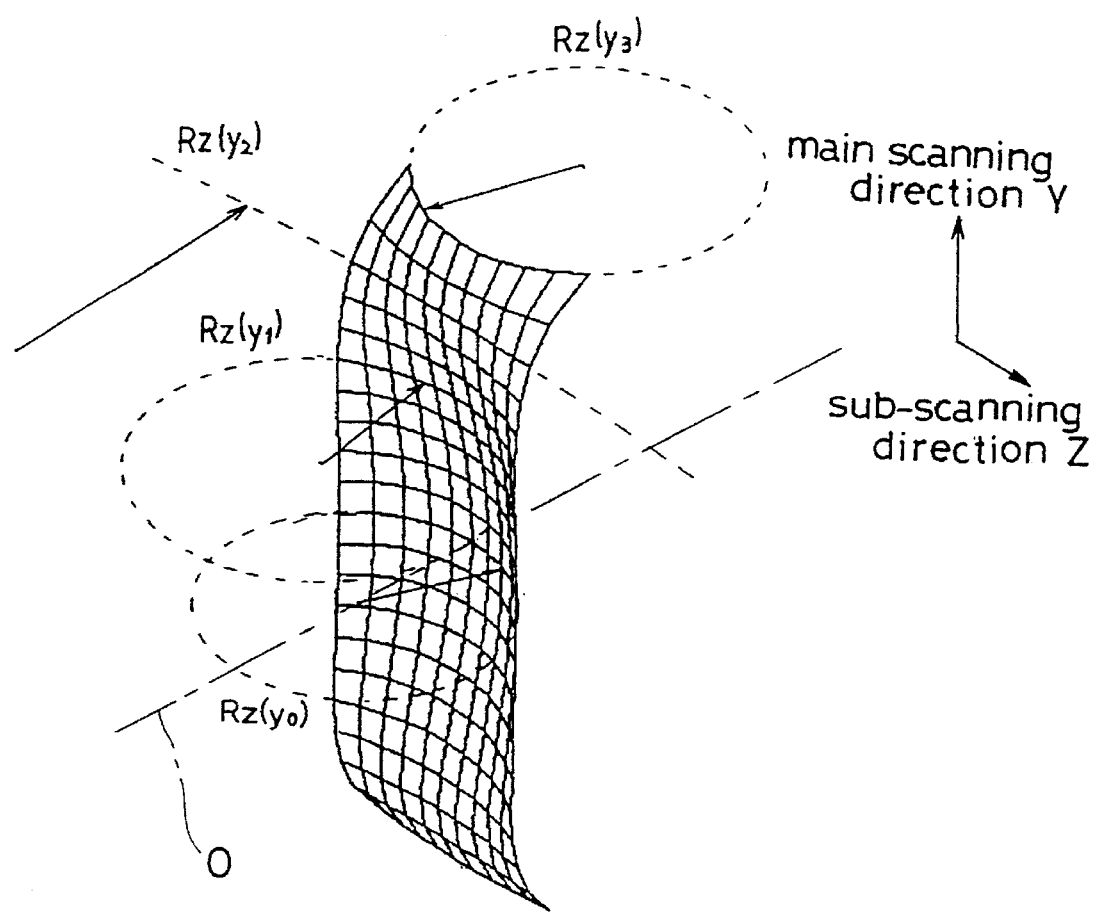
FIG. 4 is a conceptional figures of an aspherical surface which has no rotational axis and which is not rotationally symmetrical and used in the scanning optical system to which the present invention is applied.

FIG. 4 shows a conceptual figure of an aspherical surface which has no rotational axis and is not rotationally symmetrical about the optical axis O. A radius of curvature of the aspherical surface along the sub-scanning direction Z away from the optical axis 0 is set independent of the shape of the aspherical surface along the main scanning direction Y. The aspherical surface of this type is defied by the following equations:

$$x = Cy^2/\{1+[1-(1+K)C^2y^2]^{1/2}\} + A4y^4 + A6y^6 + A8y^8 + A10y^{10} + \ldots \quad (a)$$

$$1/R_z = (1/R_{zo}) + B1y + B2y^2 + B3y^3 + B4y^4 + \ldots \quad (b)$$

wherein

"$R_z$" represents a radius of curvature along the sub-scanning direction, and

"$R_{zo}$" represents a radius of curvature of a reference spherical surface along the sub-scanning direction.

As for the above equation (b), since B1 and B3 are both equal to 0 (zero) in the first aspect of the present invention, the equation (b) may be replaced with the below equation (b)[1]:

$$1/R_z = (1/R_{zo}) + B2y^2 + B4y^4 + B6y^6 + \ldots \quad (b)^1$$

The combination of a cross section along the mainscanning direction defined by the equation (a) and circular arcs defined by the equation (b) or (b)[1] shows the shape of the above aspherical surface which has no rotational axis and is not rotationally symmetrical about the optical axis O.

The curvature of field in the sub-scanning direction Z can be effectively corrected by forming either surface of the anamorphic lens 21, e.g., the second surface 21b, as the above-noted type of aspherical surface, having no rotational axis and not rotationally symmetrical about the optical axis of the anamorphic 21. The degree of asphericity of the aspherical surface is defined depending upon the types of lens systems.

The first aspect of the present invention will be explained below with the following first, second and third embodiments including concrete numerical values.

Figure 7:
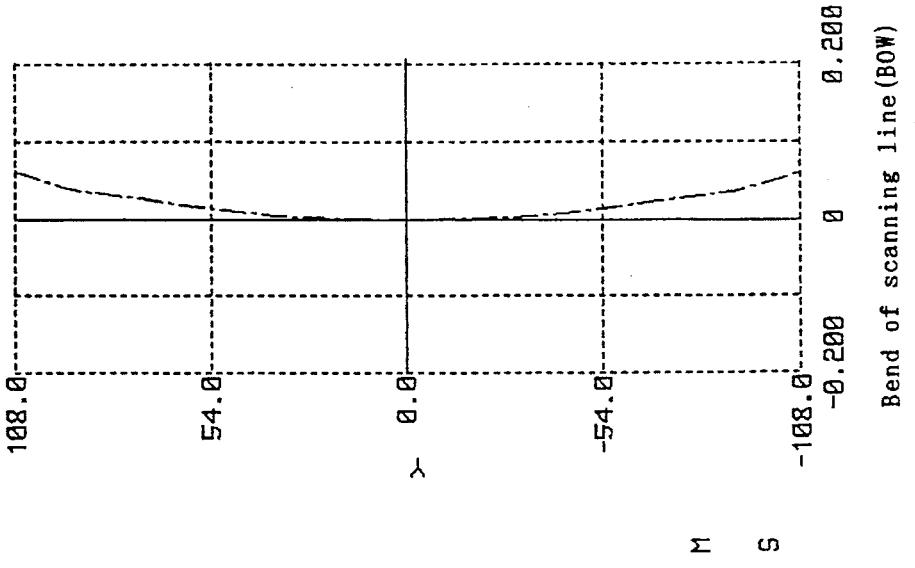
FIG. 7 is a graph showing the bow in the scanning optical system according to the first embodiment of the present invention.
Figure 6:
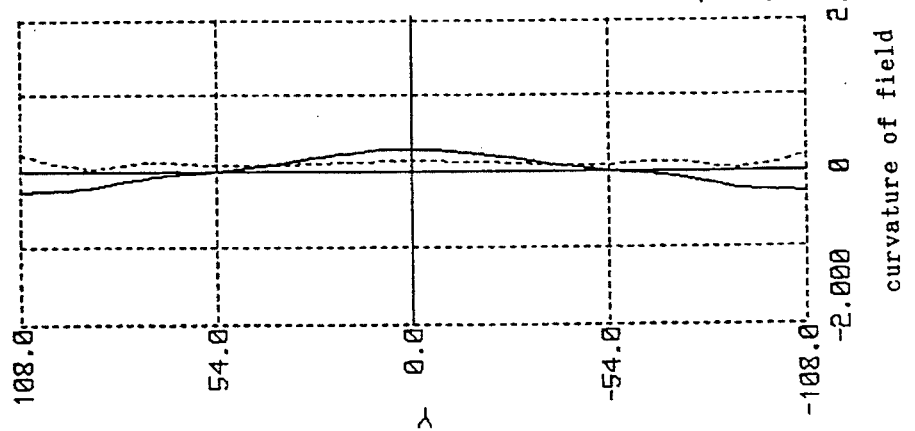
FIG. 6 is a graph showing the curvature of field in the scanning optical system according to the first embodiment of the present invention.
Figure 5:
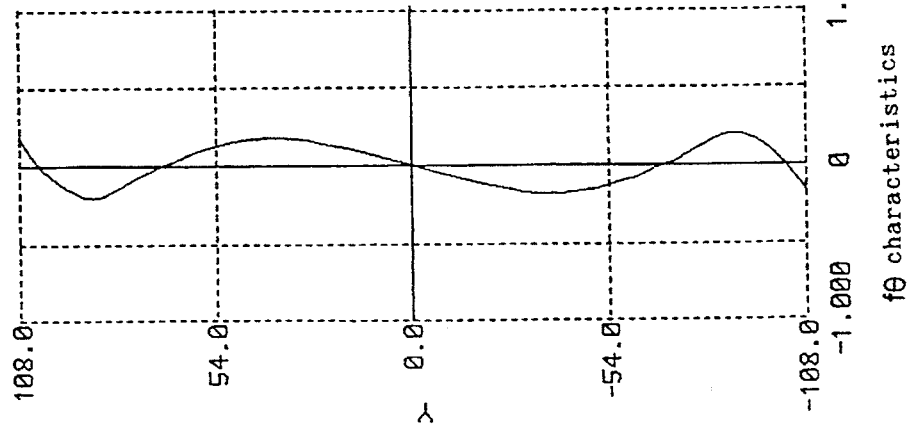
FIG. 5 is a graph showing the fθ characteristic in the scanning optical system according to the first embodiment of the present invention.

In a first embodiment of the present invention, FIG. 5 is a graph showing the result of measurement of the fθ characteristic in the scanning optical system shown in FIG. 1 and 2 and having the concrete numerical values shown in Table 1. FIG. 6 shows a graph showing the result of measurement of the curvature of field in the scanning optical system in the meridional section M, i.e., main-scanning direction, and in the sagittal section S, i.e., sub-scanning direction. FIG. 7 shows a graph showing the result of measurement of the bow, i.e., a bend of a scanning line in the sub-scanning direction Z, occurring in the scanning system. In FIGS. 5, 6 and 7, the vertical line shows the position in the main-scanning direction Y. In FIGS. 5 and 7, the horizontal line shows the displacement of the image height with respect to the ideal image height (mm). In FIG. 6, the horizontal line shows the displacement of the image plane with respect to the ideal image plane (mm).

In the Tables below, "W" represents width, "α" represents the angle shown in FIG. 1, "β" represents the angle shown in FIG. 1, "e" represents a displacement amount of the anamorphic lens 21 shown in FIG. 1, "R" represents a radius of curvature of each lens surface along the main scanning direction Y, "$R_z$" represents a radius of curvature of each lens surface along the sub-scanning direction Z, "D" represents a lens thickness of lens or distance between lens surfaces, and "N" represents a refractive index to the wavelength of 780 nm. In the embodiment, it is not necessary to provide the condenser lens 17 shown in FIG. 1 since the laser beam incident upon the polygonal mirror 11 is a parallel beam in the main scanning direction Y.

TABLE 1 scanning coefficient = 170.0
W = 216
α = 4°
β = 6°
e = −2.60
deviation amount of the scanning position when y = 0: −3.24

| Surface No. | R | D | N |
| --- | --- | --- | --- |
| deflection point (polygonal mirror 11) | | 60.00 | |
| 1(mirror 20)* | −336.000 | 107.00 | |
| 2(toric lens 21)* | 1300.000 | 6.00 | 1.48617 |
| 3(toric lens 21)** | 655.000 | 58.00 | |

"*" indicates an aspherical surface which is rotationally symmetrical about the optical axis.
"**" indicates an aspherical surface which has no rotational axis and is not rotationally symmetrical about the optical axis.
Aspherical Surface Data:

The first surface, i.e., surface No. 1 of mirror 20

K = −2.50    A4 = 4.55 × $10^{-8}$    A6 = 5.80 × $10^{-12}$
A8 = 3.22 × $10^{-17}$    A10 = 0

The second surface, i.e., surface No. 2 of toric lens 21

K = 2.90    A4 = −8.80 × $10^{-8}$    A6 = 1.52 c $10^{-11}$

TABLE 1-continued

A8 = −5.22 × $10^{-16}$    A10 = 0

The third surface, i.e., surface No. 3 of toric lens 21

K = 2.58    A4 = 2.22 × $10^{-7}$    A6 = 1.80 × $10^{-11}$
A8 = −3.37 × $10^{-16}$    A10 = 0
$R_z$ = −23.36    B2 = 4.43 × $10^{-7}$    B4 = 1.75 × $10^{-11}$
B6 = 1.98 × $10^{15}$

In a second embodiment of the present invention, FIG. 8 is a graph showing the result of measurement of the fθ characteristic in the scanning optical system shown in FIGS. 1 and 2 and having the concrete numerical values shown in Table 2. FIG. 9 shows a graph showing the result of measurement of the curvature of field in the scanning optical system in the meridional section M, i.e., main-scanning direction, and in the sagittal section S, i.e., sub-scanning direction. FIG. 10 shows a graph showing the result of measurement of the bow, i.e., a bend of a scanning line in the sub-scanning direction Z, occurring in the scanning system. In FIGS. 8, 9 and 10, the vertical line shows the position in the main-scanning direction Y. In FIGS. 8 and 10, the horizontal line shows the displacement of the image height with respect to the ideal image height (mm). In FIG. 9, the horizontal line shows the displacement of the image plane with respect to the ideal image plane (mm). Also in this embodiment, it is not necessary to provide the condenser lens 17 shown in FIG. 1 since the laser beam incident upon the polygonal mirror 11 in a parallel beam in the main scanning direction Y.

TABLE 2 scanning coefficient = 191.0
W = 216
α = 4°
β = 6°
e = −2.80
deviation amount of the scanning position when y = 0: −3.37

| Surface No. | R | D | N |
| --- | --- | --- | --- |
| deflection point (polygonal mirror 11) | | 75.00 | |
| 1(mirror 20)* | −368.100 | 122.00 | |
| 2(toric lens 21)* | −972.000 | 6.00 | 1.48617 |
| 3(toric lens 21)** | ∞ | 60.00 | |

"*" indicates an aspherical surface which is rotationally symmetrical about the optical axis.
"**" indicates an aspherical surface which has no rotational axis and is not rotationally symmetrical about the optical axis.
Aspherical Surface Data:

The first surface, i.e., surface No. 1 of mirror 20

K = 0.63    A4 = 1.95 × $10^{-8}$    A6 = 3.89 × $10^{-12}$
A8 = 1.12 × $10^{-15}$    A10 = 0

The second surface, i.e., surface No. 2 of toric lens 21

K = 0    A4 = 1.16 × $10^{-7}$    A6 = 2.95 × $10^{-11}$
A8 = −1.84 × $10^{-15}$    A10 = 0

The third surface, i.e., surface No. 3 of toric lens 21

K = 0    A4 = 1.13 × $10^{-7}$    A6 = 1.80 × $10^{-11}$
A8 = −1.04 × $10^{-15}$    A10 = 0
$R_z$ = −24.00    B2 = 4.97 × $10^{-7}$    B4 = 8.48 × $10^{-11}$
B6 = 8.63 × $10^{-15}$

Figure 11:
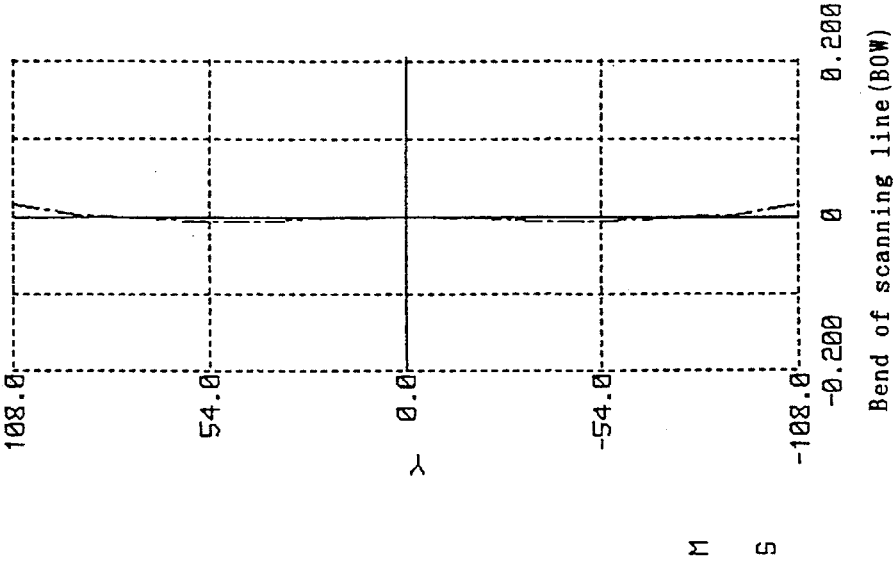
FIG. 11 is a graph showing the fθ characteristic in the scanning optical system according to the third embodiment of the present invention.
Figure 12:
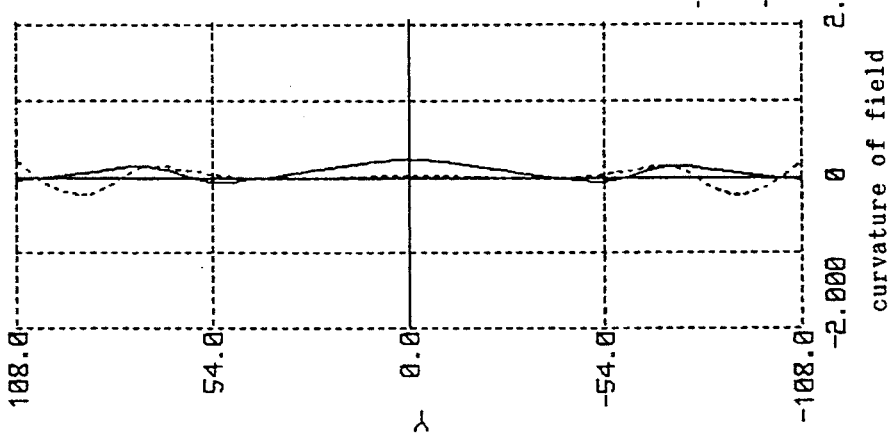
FIG. 12 is a graph showing the curvature of field in the scanning optical system according to the third embodiment of the present invention.
Figure 13:
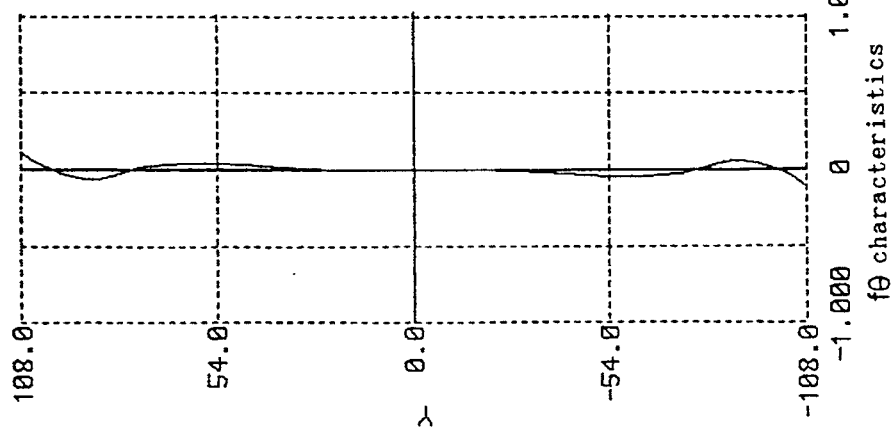
FIG. 13 is a graph showing the bow in the scanning optical system according to the third embodiment of the present invention.

In a third embodiment of the present invention, FIG. 11 is a graph showing the result of measurement of the fθ characteristic in the scanning optical system shown in FIGS. 1 and 2 and having the concrete numerical values shown in Table 3. FIG. 12 shows a graph showing the result of measurement of the curvature of field in the scanning optical system in the meridional section M, i.e., main-scanning direction, and in the sagittal section S, i.e., sub-scanning direction. FIG. 13 shows a graph showing the result of measurement of the bow, i.e., a bend of a scanning line in the sub-scanning direction, occurring in the scanning system. In FIGS. 11, 12, and 13, the vertical line shows the position in the main-scanning direction Y. In FIGS. 11 and 13, the horizontal line shows the displacement of the image height with respect to the ideal image height (mm). In FIG. 12, the horizontal line shows the displacement of the image plane with respect to the ideal image plane (mm). In this embodiment, the laser beam incident upon the polygonal mirror 11 is a converged beam along the main scanning direction Y. The converged point of the laser beam is 524.89 mm from the curved mirror 20.

TABLE 3 scanning coefficient = 191.0
W = 216
α = 4°
β = 6°
e = −2.60
deviation amount of the scanning position when y = 0: −3.28

| Surface No. | R | D | N |
|---|---|---|---|
| deflection point (polygonal mirror 11) | | 60.00 | |
| 1(mirror 20)* | −487.410 | 107.00 | |
| 2(toric lens 21)* | −784.000 | 6.00 | 1.48617 |
| 3(toric lens 21)** | −2440.000 | 58.01 | |

"*" indicates an aspherical surface which is rotationally symmetrical about the optical axis.
"**" indicates an aspherical surface which has no rotational axis and is not rotationally symmetrical about the optical axis.
Aspherical Surface Data:

The first surface, i.e., surface No. 1 of mirror 20

$K = -2.42$  $A4 = 5.17 \times 10^{-8}$  $A6 = 1.58 \times 10^{-12}$
$A8 = 3.07 \times 10^{-15}$  $A10 = 0$ The second surface, i.e., surface No. 2 of toric lens 21

$K = 2.93$  $A4 = -9.67 \times 10^{-8}$  $A6 = 3.12 \times 10^{-11}$
$A8 = -1.55 \times 10^{-11}$  $A10 = 0$ The third surface, i.e., surface No. 3 of toric lens 21

$K = 0$  $A4 = 2.06 \times 10^{-7}$  $A6 = 2.69 \times 10^{-11}$
$A8 = -9.62 \times 10^{-16}$  $A10 = 0$
$R_z = -22.06$  $B2 = 7.59 \times 10^{-7}$  $B4 = 1.18 \times 10^{-10}$
$B6 = 8.00 \times 10^{-15}$ As can be seen from the foregoing, according to a scanning optical system to which the first aspect of the present invention is applied, the curvature of field in both the main and sub-scanning directions can be corrected. Furthermore, only a small bow occurs and the scanning system excels in its fθ characteristic.

FIGS. 14–29 relate to a scanning optical system according to a second aspect of the present invention. The basic structure of this scanning optical system is the same as that of the scanning optical system in accordance with the first aspect of the present invention shown in FIGS. 1 and 2. This scanning optical system does not have a condenser lens corresponding to the condenser lens 17. Although this scanning optical system has a mirror corresponding to the mirror 22, the mirror is not shown in FIGS. 14 and 15.

The main feature of the scanning optical system according to the second aspect of the present invention comprises disposing an anamorphic lens 31 between the curved mirror 20 and the scanning surface 23.

Figure 15:
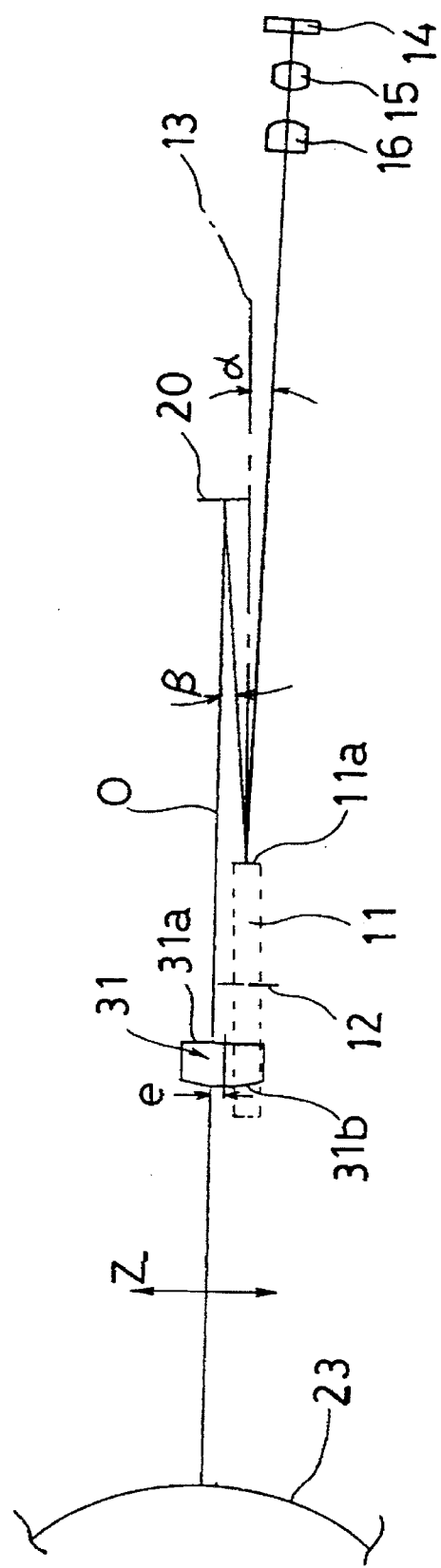
FIG. 15 shows the arrangement of the scanning optical system shown in FIG. 14 along a sub-scanning plane.
Figure 29:
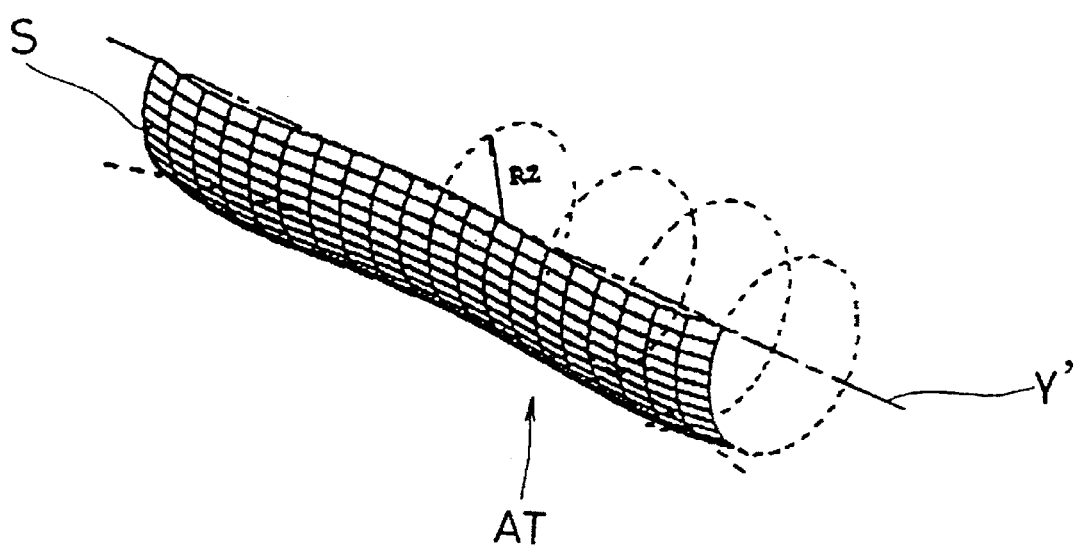
FIG. 29 is a conceptional figure illustrating a surface having a rotational axis parallel to the main scanning direction, the surface being formed as an aspherical cross section along the main scanning direction.

At least one of the first and second surfaces 31a and 31b of the anamorphic lens 31 is formed to have an aspherical surface, i.e., aspherical toric surface AT, along the main scanning direction Y, having a rotational axis substantially parallel to the main scanning direction Y. The conceptual figures of the aspherical toric surface AT is shown in FIG. 29. In FIG. 29, the surface AT is formed by the rotation of segments of lines S about an axis Y' parallel to the main scanning direction Y, the segments of lines being not rotationally symmetrical about the optical axis of the anamorphic lens 31. The anamorphic lens 31 has power mainly in the sub-scanning direction Z and is disposed in a manner such that the optical axis thereof is shifted away from the optical axis O of the scanning optical system, or from a laser beam scanning plane, by a distance "e" as shown in FIG. 15. As noted above, this displacement is effective for correcting the deviation of a wave surface of light which occurs when the laser beam incident upon the light deflector 11 has an angle with respect to the sub-scanning direction Z.

Figure 14:
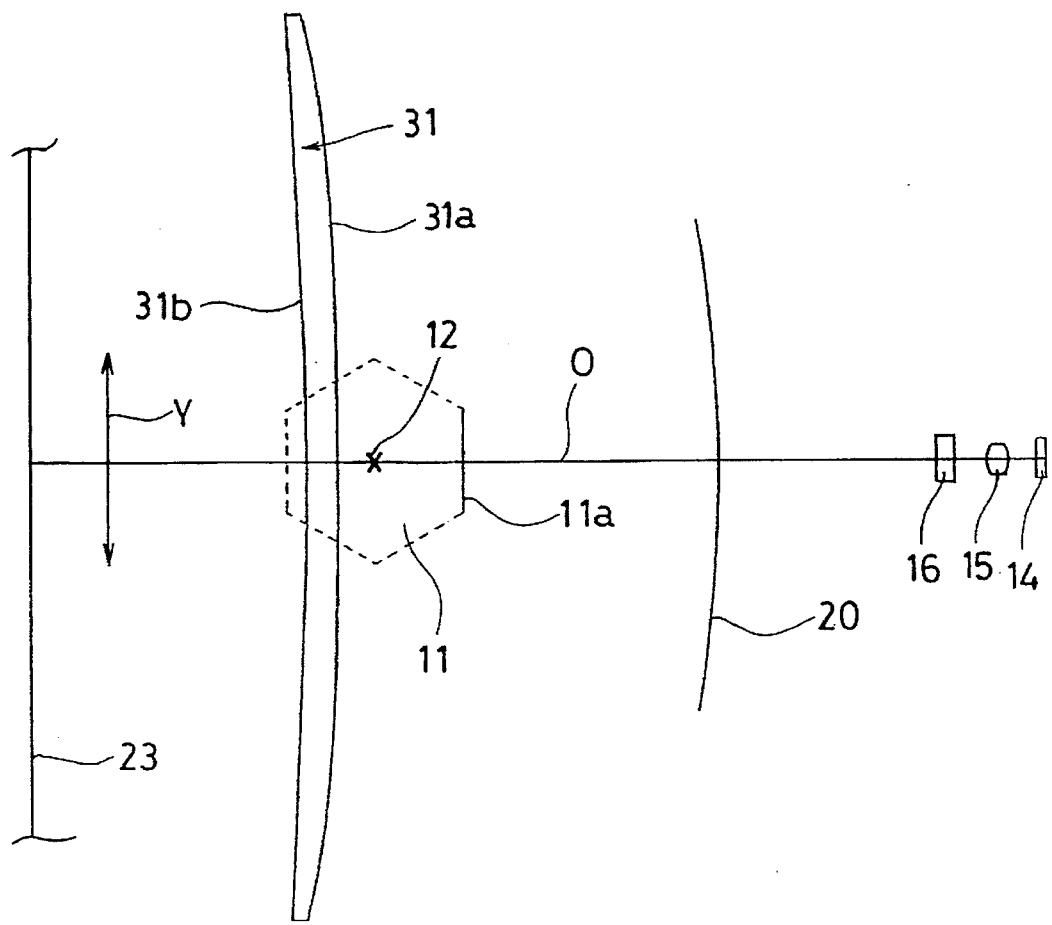
FIG. 14 shows the arrangement of a scanning optical system along a main-scanning plane, according to the fourth embodiment of the present invention.

In FIGS. 14 and 15, for the purpose of illustration, the polygonal mirror 11 and the anamorphic lens 31 are illustrated as if they were interfering with each other. In practice, the polygonal mirror 11 and the anamorphic lens 31 do not interfere with each other because a mirror and the like, corresponding to the mirror 22 shown in FIGS. 1 and 2 in the scanning optical system, are provided.

In the scanning optical system to which the second aspect of the present invention is applied, the laser beam emitted from the semiconductor laser 14 passes through the collimator lens 15 and the cylindrical lens 16 and is incident upon the polygonal mirror 11 toward the rotational center thereof to be reflected by the plurality of reflection surfaces 11a. The laser beam is made to be a line image which is converged mainly along the sub-scanning direction Z in the vicinity of one of the plurality of reflection surfaces 11a which faces the curved mirror 20. The laser beam reflected by the plurality of reflection surfaces 11a is reflected by the curved mirror 20, converged in the sub-scanning direction Z by the anamorphic lens 31, and incident upon the scanning surface 23 to scan the same. Thus, the laser beam emitted from the semiconductor 14 is converged onto the scanning surface 23 in the main scanning direction Y mainly by the curved mirror 20 and in the sub-scanning direction Z by the cylindrical lens 16 and the anamorphic lens 31.

One feature of the scanning optical system according to the second aspect of the present invention comprises forming the anamorphic lens 31 in a manner such that the anamorphic lens 31 has a toric surface having an aspherical surface, along the main scanning direction Y, having a rotational axis parallel to the main scanning direction Y. Another feature of the scanning optical system according to the second aspect of the present invention comprises forming the curved mirror 20 to have an aspherical surface at least along the main scanning direction Y.

The curvature of field in the main and sub-scanning directions Y and Z can be well corrected by forming either surface of the anamorphic lens 31, e.g., the second surface 31b, as a toric surface having an aspherical surface, along the main scanning direction Y, having a rotational axis parallel to the main scanning direction Y. The curvature of field in the main scanning direction Y and the fθ characteristic can be better corrected by further forming the aspherical surface of the curved mirror 20 as an aspherical surface, at least along the main scanning direction Y, rotationally symmetrical about the optical axis, i.e., center axis, of the curved mirror 20. Furthermore, the performances of the scanning optical system in the main and sub-scanning directions are well balanced by forming the surface 31a of the anamorphic lens 31 as an aspherical surface which is rotationally symmetrical about the optical axis of the anamorphic lens 31.

The second aspect of the present invention will be explained below with the following fourth, fifth and sixth embodiments including concrete numerical values.

Figure 18:
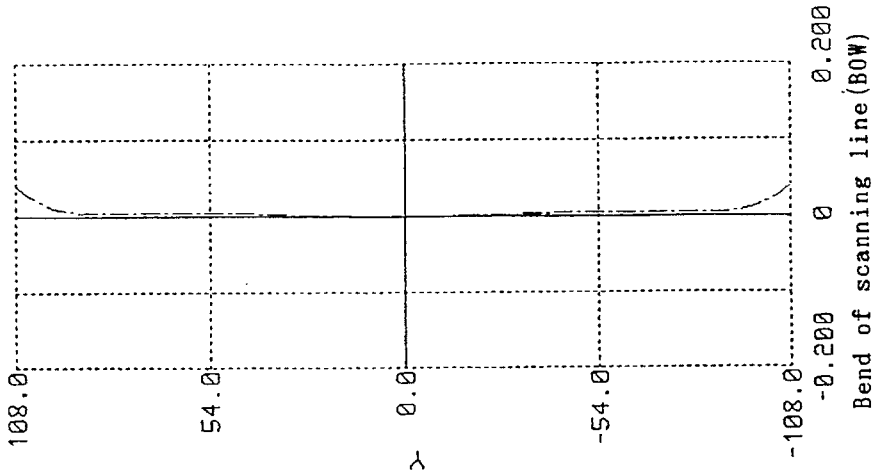
FIG. 18 is a graph showing the curvature of a scanning line in the scanning optical system according to the fourth embodiment of the present invention.
Figure 17:
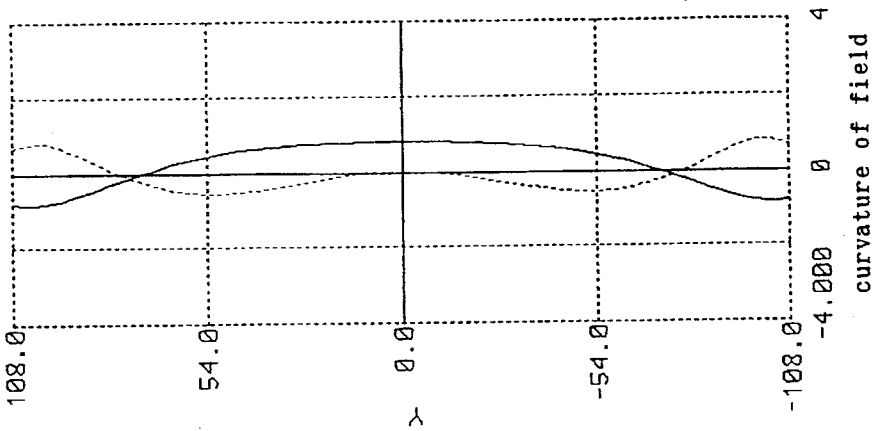
FIG. 17 is a graph showing the curvature of field in the scanning optical system according to the fourth embodiment of the present invention.
Figure 16:
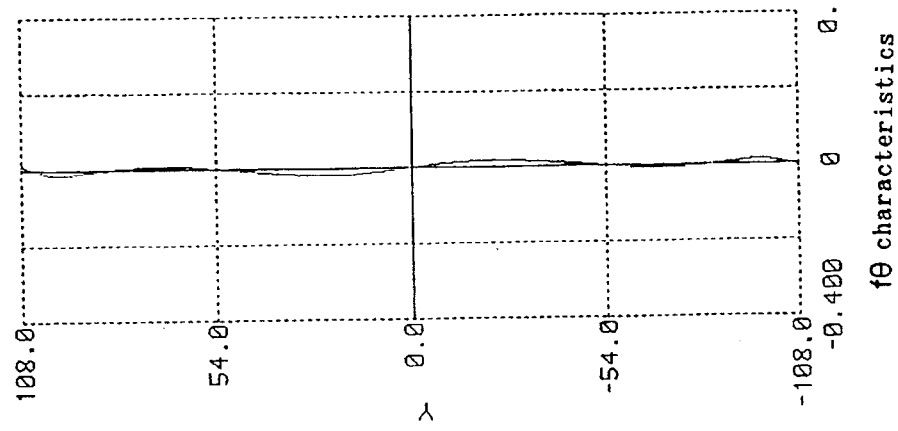
FIG. 16 is a graph showing the fθ characteristic in the scanning optical system according to the fourth embodiment of the present invention.
Figure 19:
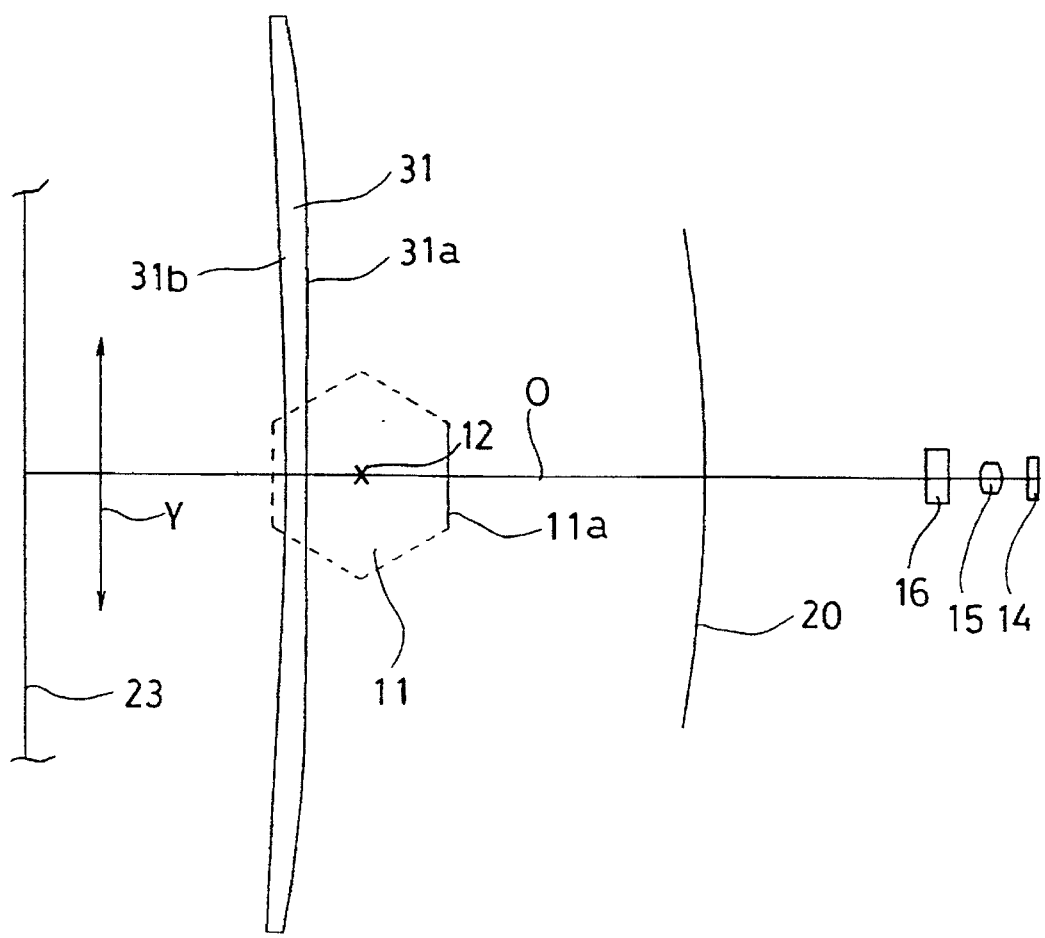
FIG. 19 shows the arrangement of a scanning optical system along a main-scanning plane, according to the fifth embodiment of the present invention.
Figure 20:
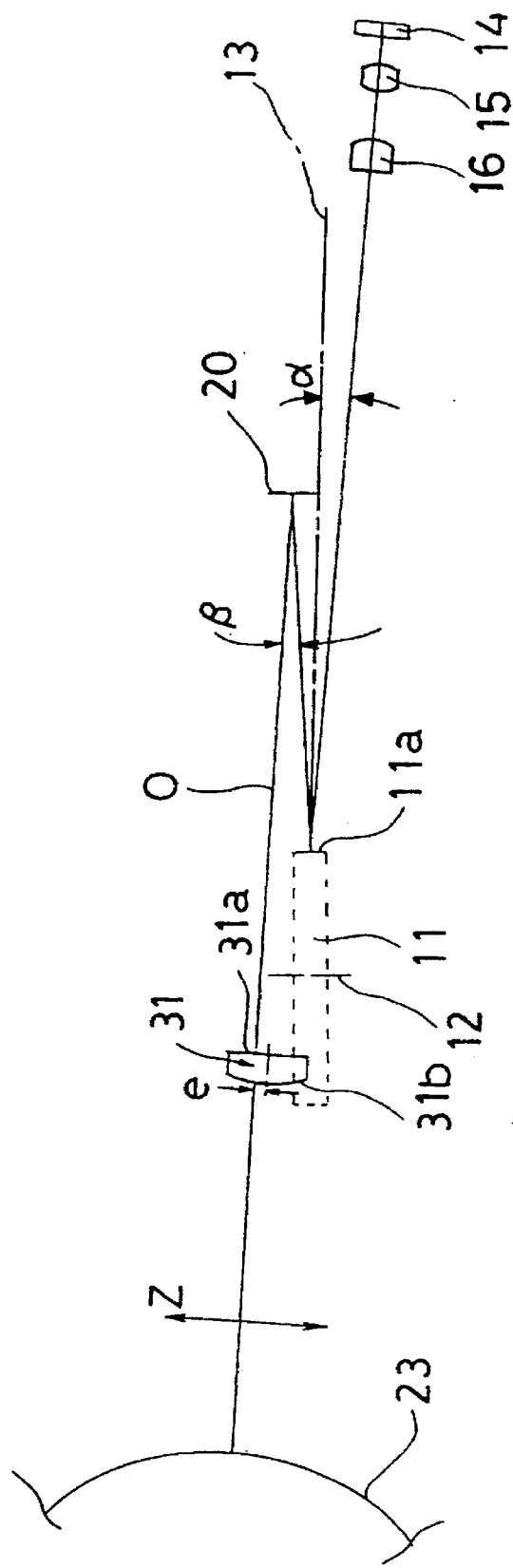
FIG. 20 shows the arrangement of the scanning optical system shown in FIG. 19 along a sub-scanning plane.

In a fourth embodiment of the present invention, FIG. 16 is a graph showing the result of measurement of the fθ characteristic in the scanning optical system shown in FIGS. 14 and 15 and having the concrete numerical values shown in Table 4. FIG. 17 shows a graph showing the result of measurement of the curvature of field in the scanning optical system in the meridional section M, i.e., main-scanning direction, and in the sagittal section S, i.e., sub-scanning direction. FIG. 18 shows a graph showing the result of measurement of the bow, i.e., a bend of a scanning line in the sub-scanning direction Z, occurring in the scanning optical system. In FIGS. 16, 17, and 18, the vertical line shows the position in the main scanning direction Y. In FIGS. 16 and 18, the horizontal line shows the displacement of the image height with respect to the ideal image height (mm). In FIG. 17, the horizontal line shows the displacement of the image plane with respect to the ideal image plane (mm).

In the Tables below, "W" represents a scanning width, "α" represents the angle shown in FIG. 15, "β" represents the angle shown in FIG. 15, "e" represents a displacement amount of the anamorphic lens 31, "R" represents the radius of curvature of each lens surface along the main scanning direction Y, "$R_z$" represents the radius of curvature of each lens surface along the sub-scanning direction Z, "D" represents a lens thickness of lens or distance between lens surfaces, and "N" represents refractive index to the wavelength of 780 nm.

TABLE 4 scanning coefficient = 135.5
W = 216
α = 3.5°
β = 5°
e = −1.55

| Surface No. | R | $R_2$ | D | N |
|---|---|---|---|---|
| cylindrical lens 16 | ∞ | 55.424 | 2.00 | 1.48617 |
|  | ∞ | (plane) | 113.00 |  |
| deflection point (polygonal mirror 11) |  |  | 50.00 |  |
| 1(mirror 20)* | −261.912 | (R.S.) | 74.52 |  |
| 2(anamorphic* | 2577.212 | (R.S.) | 6.00 | 1.48617 |
| 3 lens 31)** | 582.047 | −20.412 | 54.23 |  |

"*" indicates an aspherical surface which is rotationally symmetrical about the optical axis.
"**" indicates a surface having an aspherical surface along the main scanning direction Y, the aspherical surface having a rotational axis parallel to the main scanning direction.
"R.S." represents a surface which is rotationally symmetrical about an optical axis.
Aspherical Surface Data:

The first surface, i.e., surface No. 1 of mirror 20

K = 4.44   A4 = 1.21 × 10⁻⁷   A6 = 8.27 × 10⁻¹²
A8 = 4.44 × 10⁻¹⁶

The second surface, i.e., surface No. 2 of anamorphic lens 31

K = 0   A4 = −8.53 × 10⁻⁸   A6 = 3.10 × 10⁻¹⁴
A8 = −7.40 × 10⁻¹⁷

The third surface, i.e., surface No. 3 of anamorphic lens 31

K = 0   A4 = −1.02 × 10⁻⁷   A6 = 8.37 × 10⁻¹²
A8 = −2.33 × 1−⁻¹⁶

Figure 23:
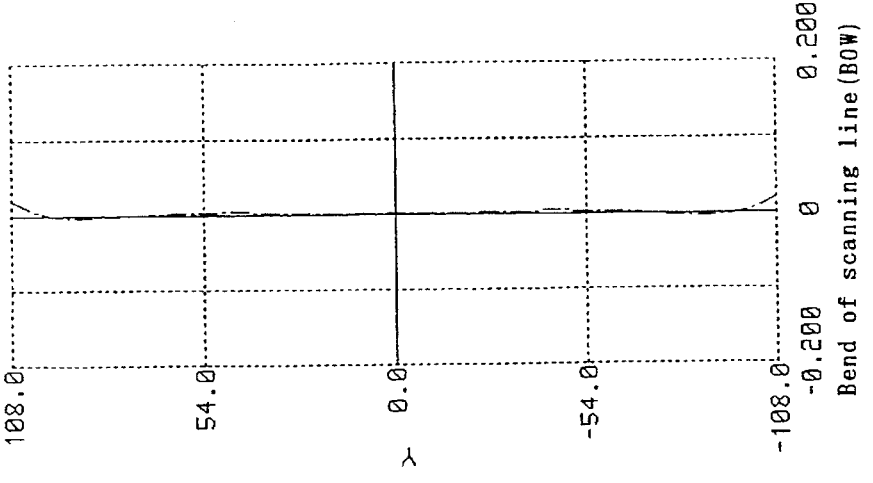
FIG. 23 is a graph showing the curvature of a scanning line in the scanning optical system according to the fifth embodiment of the present invention.
Figure 22:
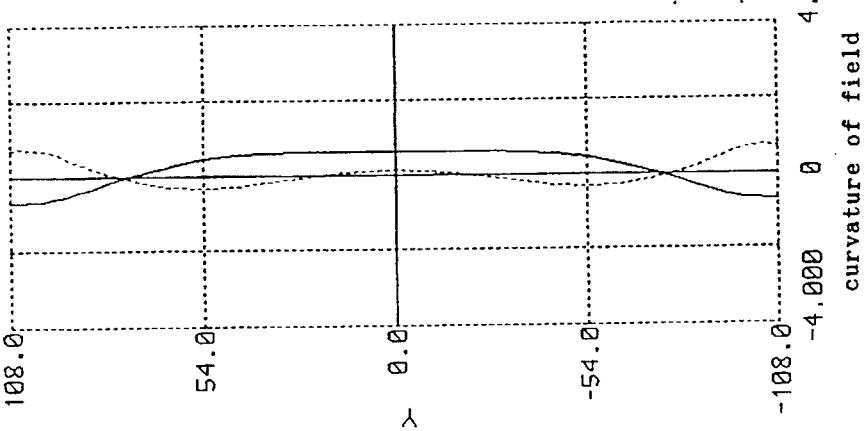
FIG. 22 is a graph showing the curvature of field in the scanning optical system according to the fifth embodiment of the present invention.
Figure 21:
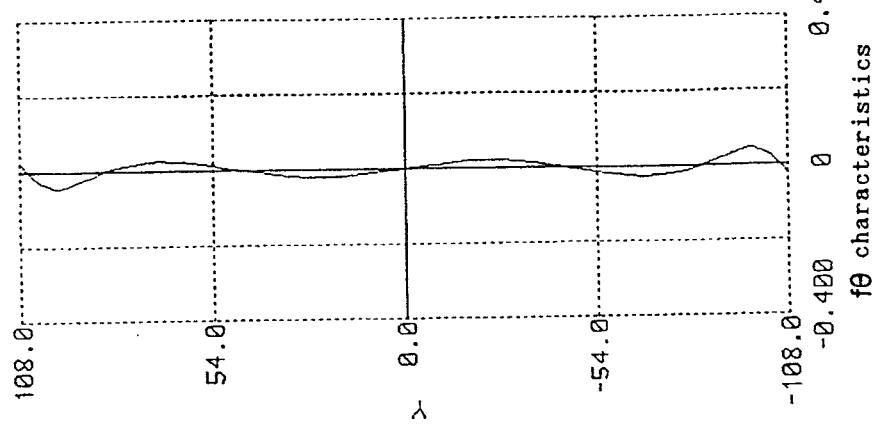
FIG. 21 is a graph showing the fθ characteristic in the scanning optical system according to the fifth embodiment of the present invention.
Figure 24:
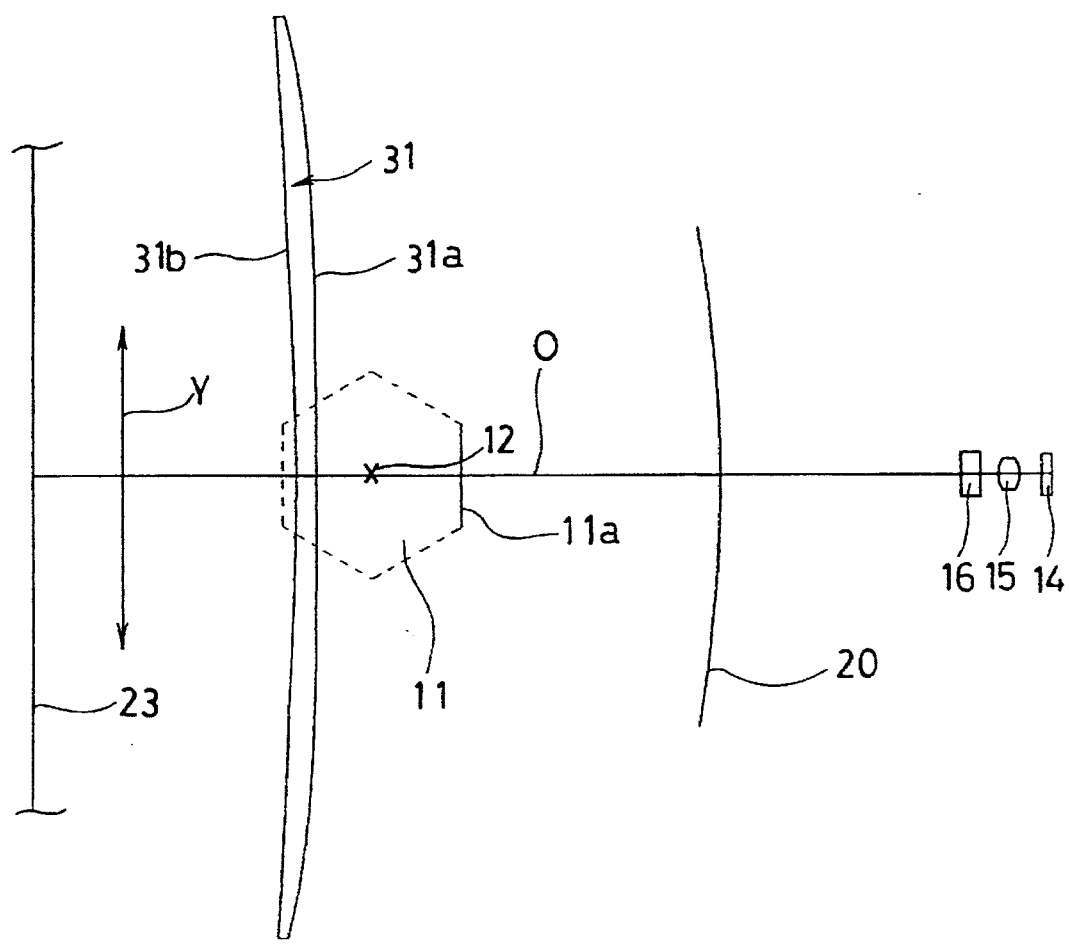
FIG. 24 shows the arrangement of a scanning optical system along a main-scanning plane, according to the sixth embodiment of the present invention.
Figure 25:
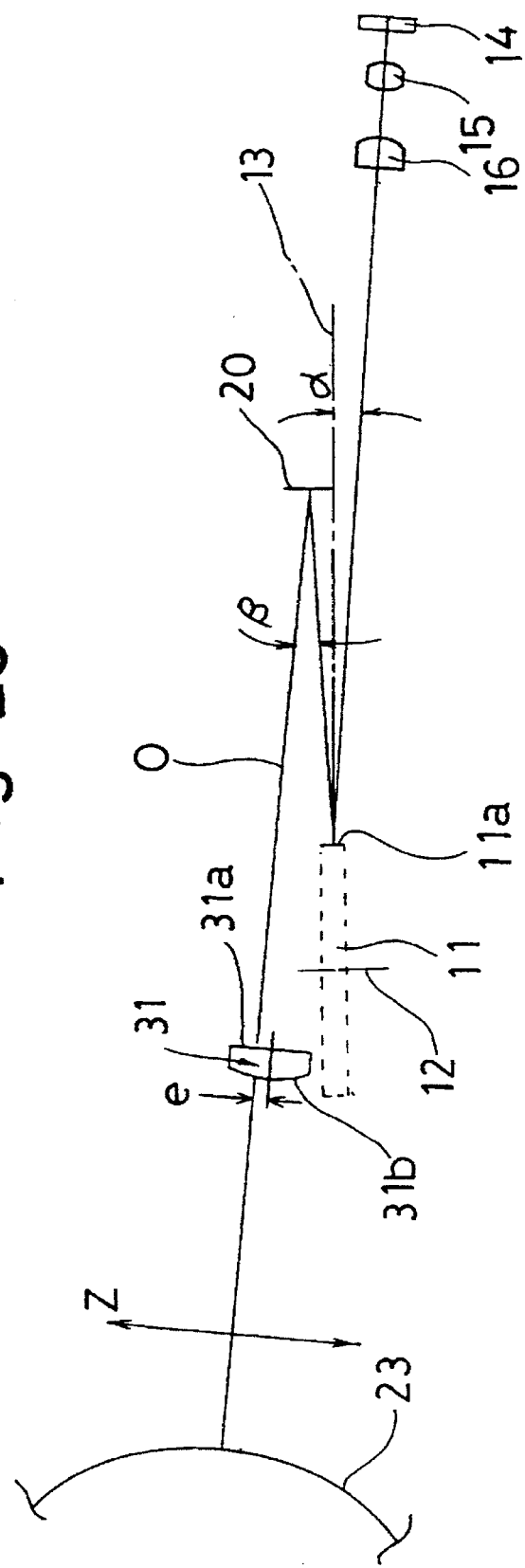
FIG. 25 shows the arrangement of the scanning optical system shown in FIG. 24 along a sub-scanning plane.

FIGS. 19–23 and Table 5 below relate to a scanning optical system according to a fifth embodiment of the present invention. FIG. 21 is a graph showing the result of measurement of the fθ characteristic in the scanning optical system shown in FIGS. 19 and 20 and having the concrete numerical values shown in Table 5. FIG. 22 shows a graph showing the result of measurement of the curvature of field in the scanning optical system in the meridional section M, i.e., main-scanning direction, and in the sagittal section S, i.e., sub-scanning direction. FIG. 23 shows a graph showing the result of measurement of the bow, i.e., a bend of a scanning line in the sub-scanning direction Z, occurring in the scanning optical system. In FIGS. 21, 22 and 23, the vertical line shows the position in the main-scanning direction Y. In FIGS. 21 and 23, the horizontal line shows the displacement of the image height with respect to the ideal image height (mm). In FIG. 22, the horizontal line shows the displacement of the image plane with respect to the ideal image plane (mm).

TABLE 5 scanning coefficient = 135.5
W = 216
α = 4°
β = 7°
e = −1.74

| Surface No. | R | $R_2$ | D | N |
|---|---|---|---|---|
| cylindrical lens 16 | ∞ | 55.424 | 2.00 | 1.48617 |
|  | ∞ | (plane) | 113.00 |  |
| deflection point (polygonal mirror 11) |  |  | 50.00 |  |
| 1(mirror 20)* | −257.770 | (R.S.) | 77.80 |  |
| 2(anamorphic | −3672.150 | (R.S.) | 4.00 | 1.48617 |
| 3 lens 31)** | 568.667 | −19.400 | 50.94 |  |

"*" indicates an aspherical surface which is rotationally symmetrical about the optical axis.
"**" indicates a surface having an aspherical surface along the main scanning direction Y, the aspherical surface having a rotational axis parallel to the main scanning direction.
"R.S." represents a surface which is rotationally symmetrical about an optical axis.
Aspherical surface Data:

The first surface, i.e., surface No. 1 of mirror 20

K = 5.55   A4 = 1.33 × 10⁻⁷   A6 = 7.35 × 10⁻¹²
A8 = 4.90 × 10⁻¹⁶

The second surface, i.e., surface No. 2 of anamorphic lens 31

K = 0   A4 = −8.62 × 10⁻⁸   A6 = 1.95 × 10⁻¹²
A8 = −2.45 × 10⁻¹⁶

The third surface, i.e., surface No. 3 of anamorphic lens 31

K = 0   A4 = −1.06 × 10⁻⁷   A6 = 8.80 × 10⁻¹²
AB = −2.98 × 10⁻¹⁶

Figure 28:
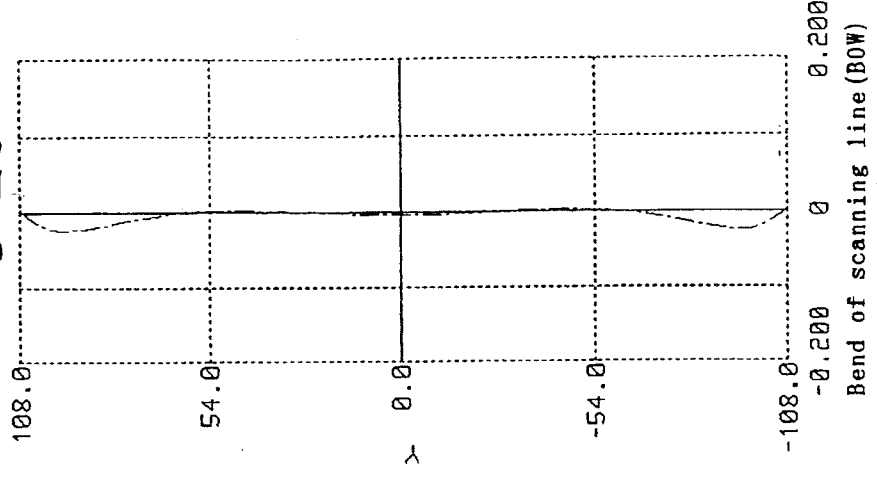
FIG. 28 is a graph showing the curvature of a scanning line in the scanning optical system according to the sixth embodiment of the present invention.
Figure 27:
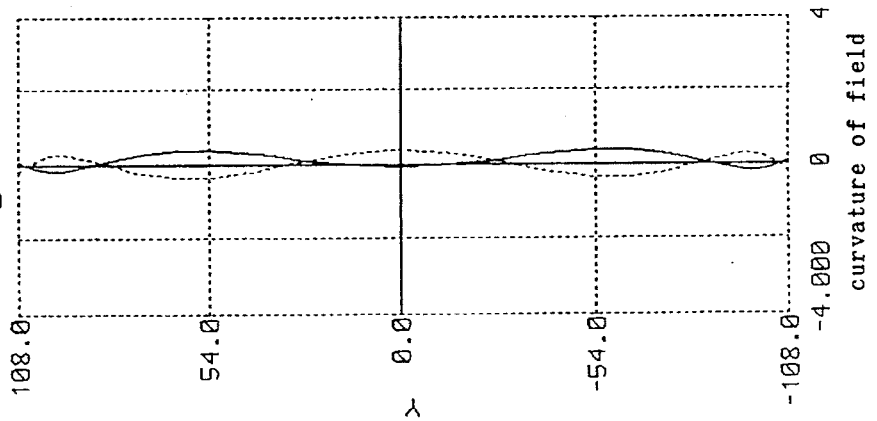
FIG. 27 is a graph showing the curvature of field in the scanning optical system according to the sixth embodiment of the present invention.
Figure 26:
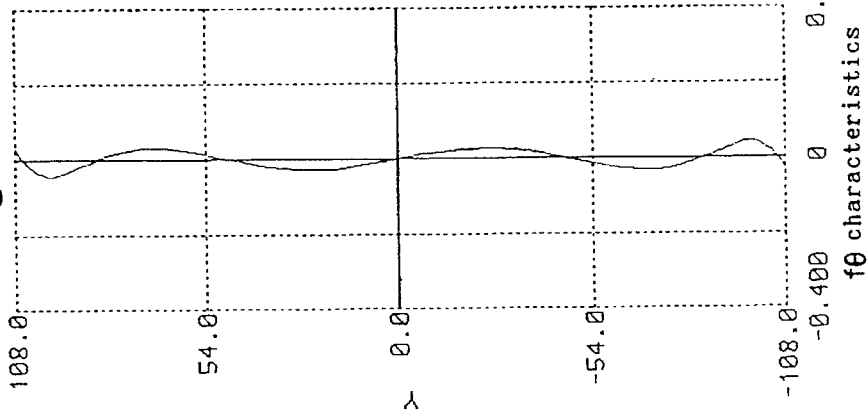
FIG. 26 is a graph showing the fθ characteristic in the scanning optical system according to the sixth embodiment of the present invention.

FIGS. 24–28 and Table 6 below relate to a scanning optical system according to a sixth embodiment of the present invention. FIG. 26 is a graph showing the result of measurement of the fθ characteristic in the scanning optical system shown in FIGS. 24 and 25 and having the concrete numerical values shown in Table 6. FIG. 27 shows a graph showing the result of measurement of the curvature of field in the scanning optical system in the meridional section M, i.e., main-scanning direction, and in the sagittal section S, i.e., sub-scanning direction. FIG. 28 shows a graph showing the result of measurement of the bow, i.e., a bend of a scanning line in the sub-scanning direction Z, occurring in the scanning optical system. In FIGS. 26, 27 and 28, the vertical line shows the position in the main-scanning direction Y. In FIGS. 26 and 28, the horizontal line shows the displacement of the image height with respect to the ideal image height (mm). In FIG. 27, the horizontal line shows the displacement of the image plane with respect to the ideal image plane (mm).

TABLE 6 scanning coefficient = 135.5
W = 216
α = 4°
β = 10°
e = −2.08

| Surface No. | R | $R_2$ | D | N |
|---|---|---|---|---|
| cylindrical lens 16 | ∞ | 55.424 | 2.00 | 1.48617 |
| | ∞ | (plane) | 113.00 | |
| deflection point (polygonal mirror 11) | | | 50.00 | |
| 1(mirror 20)* | −259.884 | (R.S.) | 77.90 | |
| 2(anamorphic* | 5000.000 | (R.S.) | 4.00 | 1.48617 |
| 3 lens 31)** | 544.306 | −19.686 | 51.42 | |

"*" indicates an aspherical surface which is rotationally symmetrical about the optical axis.
"**" indicates a surface having an aspherical surface along the main scanning direction Y, the aspherical surface having a rotational axis parallel to the main scanning direction.
"R.S." represents a surface which is rotationally symmetrical about an optical axis.
Aspherical Surface Data:

The first surface, i.e., surface No. 1 of mirror 20

K = 6.00    A4 = 1.30 × 10⁻⁷    A6 = 5.50 × 10⁻¹²
A8 = 1.96 × 10⁻¹⁶

The second surface, i.e., surface No. 2 of anamorphic lens 31

K = 0    A4 = −5.62 × 10⁻⁸    A6 = 4.02 × 10⁻¹²
A8 = −1.59 × 10⁻¹⁶

The third surface, i.e., surface No. 3 of anamorphic lens 31

K = 0    A4 = −1.17 × 10⁻⁷    A6 = 8.63 × 10⁻¹²
A8 = −9.10 × 10⁻¹⁷

As can be seen from the foregoing, according to a scanning optical system to which the second aspect of the present invention is applied, the curvature of field in both the main and sub-scanning directions can be corrected. Furthermore, only a small bow occurs and the scanning system excels in its fθ characteristic.

According to a scanning optical system to which the second aspect of the present invention is applied, the distance between the curved mirror and the scanning surface can be made long, even if the curved mirror is made small. Thus, the scanning optical system can be made small or compact. In a laser beam printer in which a scanning surface is, for instance, a photosensitive drum, a scanning optical system can accordingly be installed away from an imaging system giving off heat, thus the scanning optical unit does not suffer from the heat.

I claim:

1. A scanning optical system comprising:

a light deflector rotating about a rotational axis perpendicular to a main scanning direction;

a laser beam emitter for emitting a laser beam which scans a scanning surface along said main scanning direction and for making said laser beam incident upon said light deflector at a first angle;

a curved mirror having a curvature at least along said main scanning direction for reflecting said laser beam, deflected by said light deflector, at a second angle with respect to said laser beam incident upon said curved mirror; and, an anamorphic lens disposed between said curved mirror and said scanning surface, wherein said anamorphic lens comprises a first surface having an aspherical cross section, at least along said main scanning direction, and a second surface having a second aspherical surface which has no rotation axis, wherein a radius of curvature of said second aspherical surface along a sub-scanning direction perpendicular to said main scanning direction away from an optical axis is independent of a shape of said second aspherical surface along said main scanning direction, wherein said laser beam emitter emits said laser beam towards said rotational axis further wherein said first and second angles are measured on a sub-scanning plane which extends in said sub-scanning direction and includes said optical axis.

2. The scanning optical system of claim 1, said first aspherical surface is rotationally symmetrical about said optical axis of said anamorphic lens.

3. The scanning optical system of claim 1, wherein a reflection surface of said curved mirror is rotationally symmetrical about an optical axis of said curved mirror.

4. The scanning optical system of claim 1, said curved mirror comprising an aspherical surface along said main scanning direction.

5. The scanning optical system of claim 4, said anamorphic lens is disposed in a manner such that said optical axis of said anamorphic lens is shifted away from an optical axis of said scanning optical system in said sub-scanning direction.

6. The scanning optical system of claim 1, said anamorphic lens is disposed such that said optical axis of said anamorphic lens is shifted away from an optical axis of said scanning optical system in said sub-scanning direction.

7. A scanning optical system comprising:

a light deflector;

a laser beam emitter for emitting a laser beam which scans a scanning surface along a main scanning direction and for making said laser beam incident upon said light deflector at a first angle with respect to a sub-scanning direction perpendicular to said main scanning direction;

a curved mirror having a curvature at least along said main scanning direction for reflecting said laser beam, deflected by said light deflector, at a second angle with respect to said laser beam incident upon said curved mirror; and, an anamorphic lens disposed between said curved mirror and said scanning surface, said anamorphic lens comprising an aspherical surface, having an aspherical cross section along said main scanning direction, and having a rotational axis substantially parallel to said main scanning direction.

8. The scanning optical system of claim 7, wherein a reflection surface of said curved mirror is rotationally symmetrical about a center axis of said curved mirror.

9. The scanning optical system of claim 7, said aspherical surface is formed on a first surface of said anamorphic lens, and said anamorphic lens comprising a second surface which is rotationally symmetrical about an optical axis of said anamorphic lens.

10. The scanning optical system of claim 7, said curved mirror comprising an aspherical surface along said main scanning direction.

11. The scanning optical system of claim 10, wherein said aspherical surface diverges from a convex side of a spherical reference surface with an increase in distance from an optical axis of said anamorphic lens.

12. The scanning optical system of claim 10, said anamorphic lens is disposed such that said optical axis of said anamorphic lens is shifted away from an optical axis of said scanning optical system in said sub-scanning direction.

13. The scanning optical system of claim 7, said aspherical surface diverges from a convex side of a spherical reference surface with an increase in distance from an optical axis of said anamorphic lens.

14. The scanning optical system of claim 7, said anamorphic lens is disposed such that said optical axis of said anamorphic lens is shifted away from an optical axis of said scanning optical system in said sub-scanning direction.

15. A scanning optical system, within which a main scanning direction and a subscanning direction perpendicular to the main scanning direction are defined, comprising:

a laser beam emitter for emitting a laser beam;

a light deflector for deflecting and scanning said laser beam in a main scanning direction;

a mirror for reflecting said laser beam deflected by said light deflector; and an anamorphic lens through which said laser beam reflected by said mirror passes, wherein said anamorphic lens comprises a first surface and a second surface, said first surface being aspheric in at least said main scanning direction, and said second surface being aspherically formed without a surface-generating rotation about any straight axis.

16. The scanning optical system according to claim 15, wherein said second surface is generated by the combination of:

a curved locus extending in the main-scanning direction and curved with respect to an axis in the main scanning direction, and circular arcs generated about said curved locus within a plane perpendicular to said axis in the main scanning direction.

17. The scanning optical system according to claim 16, wherein radii of said circular arcs vary in accordance with a displacement in said main scanning direction, and said radii of said circular arcs being independent of the curvature of said curved locus.

18. The scanning optical system according to claim 17, wherein an optical axis of said anamorphic lens is defined perpendicularly to both of said main scanning and said subscanning directions, and wherein said curved locus varies in the optical axis direction in accordance with displacement from the optical axis in said main scanning direction, and said radii of said circular arcs vary in the subscanning direction in accordance with displacement from the optical axis in the main scanning direction.

19. The scanning optical system according to claim 15, wherein an optical axis of said anamorphic lens is defined perpendicularly to both of said main scanning and said subscanning directions, and wherein said second surface is defined by a curved locus of centers of curvature varying in position with respect to the optical axis and within a plane parallel to both the main scanning direction and the optical axis direction, in accordance with displacement from the optical axis in the main scanning direction, and by radii of curvature varying in magnitude in the subscanning direction and within a plane parallel to both the subscanning direction and the optical axis direction, in accordance with displacement from the optical axis in the main scanning direction.

20. A scanning optical system, within which a main scanning direction and a subscanning direction perpendicular to the main scanning direction are defined, comprising:

a laser beam emitter for emitting a laser beam;

a light deflector for deflecting and scanning said laser beam in a main scanning direction;

a mirror for reflecting said laser beam deflected by said light deflector; and an anamorphic lens through which said laser beam reflected by said mirror passes, wherein said anamorphic lens comprises a first surface and a second surface, said first surface being aspheric in said main scanning direction, and said second surface being aspheric and having radii of curvature in said sub-scanning direction varying along said main scanning direction, wherein centers of curvature of said radii of curvature follow a curved locus.

* * * * *